(12) United States Patent
Lipscomb et al.

(10) Patent No.: US 8,397,674 B2
(45) Date of Patent: Mar. 19, 2013

(54) PET FEEDING DISH AND SYSTEM

(75) Inventors: John M. Lipscomb, Cedarburg, WI (US); Stanley L. Suring, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 330 days.

(21) Appl. No.: 12/567,766

(22) Filed: Sep. 26, 2009

(65) Prior Publication Data

US 2010/0077963 A1 Apr. 1, 2010

Related U.S. Application Data

(60) Provisional application No. 61/100,505, filed on Sep. 26, 2008.

(51) Int. Cl.
*A01K 5/01* (2006.01)

(52) U.S. Cl. .......................... 119/54; 119/61.5

(58) Field of Classification Search .................. 119/54, 119/52.1, 53, 53.5, 61.3, 61.55
See application file for complete search history.

(56) References Cited

U.S. PATENT DOCUMENTS

| | | | | |
|---|---|---|---|---|
| 1,075,855 A * | 10/1913 | Riley et al. | ..................... | 119/672 |
| 1,278,583 A * | 9/1918 | Bretz | ........................... | 119/53.5 |
| 1,638,270 A * | 8/1927 | Nilsson | ........................ | 119/52.1 |
| 2,602,420 A * | 7/1952 | Peterson | ....................... | 119/53 |
| 2,854,949 A * | 10/1958 | Wiggins | ........................ | 119/53 |
| 2,944,364 A * | 7/1960 | Kelly | ............................... | 43/131 |
| 3,033,164 A * | 5/1962 | Evers | ............................... | 119/54 |
| 3,074,377 A * | 1/1963 | Spencer | ......................... | 119/54 |
| 3,648,403 A | 3/1972 | Gommel | | |
| 3,788,279 A * | 1/1974 | Boehland, Jr. | ................ | 119/52.3 |
| 3,866,576 A * | 2/1975 | Downing | ....................... | 119/477 |
| 4,029,051 A * | 6/1977 | McKinney | .................... | 119/52.4 |
| D246,627 S * | 12/1977 | Sugiyama | ....................... | D7/359 |
| 4,161,924 A * | 7/1979 | Welker | ............................ | 119/482 |
| 4,401,056 A * | 8/1983 | Cody et al. | ...................... | 119/477 |
| 4,538,548 A | 9/1985 | Page | | |
| 4,574,738 A * | 3/1986 | Tominaga | ...................... | 119/464 |
| 4,738,221 A | 4/1988 | Nock | | |
| 4,756,277 A | 7/1988 | Peng | | |
| 4,886,016 A | 12/1989 | Atchley | | |
| 4,947,796 A | 8/1990 | Robinette | | |
| 5,009,193 A | 4/1991 | Gordon | | |
| 5,092,274 A * | 3/1992 | Cole et al. | ...................... | 119/57.4 |
| 5,222,461 A | 6/1993 | Haynes | | |
| 5,335,624 A * | 8/1994 | Baxter et al. | ................... | 119/51.5 |
| 5,394,832 A * | 3/1995 | Briley | ............................. | 119/58 |
| 5,467,735 A * | 11/1995 | Chrisco | ......................... | 119/51.5 |
| 5,492,083 A * | 2/1996 | Holladay | ....................... | 119/52.1 |
| 5,649,499 A | 7/1997 | Krietzman et al. | | |

(Continued)

FOREIGN PATENT DOCUMENTS

| | | |
|---|---|---|
| EP | 0390245 | 10/1990 |
| JP | 09051736 | 2/1997 |

*Primary Examiner* — Yvonne Abbott
(74) *Attorney, Agent, or Firm* — Boyle Fredrickson, S.C.

(57) ABSTRACT

A pet feeding system that includes a dish configured to regulate intake of food by a pet, such as a cat. The dish has a housing in cooperation with a food-dispensing receptacle that dispense food into a food-receiving chamber within the housing permitting a pet to access food in the chamber through at least one food access port that only permits part of the pet to reach within the housing to get some food. The food-dispensing receptacle can be a bowl that can be integrally formed as part of the housing and can also be a food-holding container that seats in the bowl. A cap is provided that can cover food in the bowl or container preventing a pet from accessing the food.

42 Claims, 3 Drawing Sheets

U.S. PATENT DOCUMENTS

| | | | |
|---|---|---|---|
| 5,794,562 A * | 8/1998 | Hart | 119/52.4 |
| 5,850,797 A | 12/1998 | Hunicke | |
| 5,924,381 A * | 7/1999 | Bloedorn | 119/52.2 |
| D424,757 S | 5/2000 | Cooper et al. | |
| 6,073,581 A | 6/2000 | Wang | |
| 6,125,790 A | 10/2000 | Breedwell | |
| 6,142,099 A | 11/2000 | Lange, Jr. | |
| 6,167,841 B1 | 1/2001 | Ho | |
| 6,186,467 B1 | 2/2001 | Wahls | |
| D454,990 S | 3/2002 | Lorenzana | |
| 6,378,460 B1 * | 4/2002 | Skurdalsvold et al. | 119/61.56 |
| D459,841 S | 7/2002 | Ross | |
| 6,481,374 B1 * | 11/2002 | Lillig | 119/52.1 |
| 6,520,114 B1 | 2/2003 | Chun | |
| 6,557,494 B2 | 5/2003 | Pontes | |
| 6,571,734 B1 | 6/2003 | Finklea | |
| D498,565 S | 11/2004 | Cole et al. | |
| 6,845,735 B1 | 1/2005 | Northrop et al. | |
| 6,848,392 B1 | 2/2005 | Kreutzer, Jr. | |
| 6,860,229 B1 | 3/2005 | Craft | |
| 6,915,761 B1 * | 7/2005 | Campbell | 119/51.01 |
| 6,945,195 B1 | 9/2005 | Morrison | |
| 7,077,074 B2 | 7/2006 | Polimeni, Jr. | |
| 7,198,005 B2 | 4/2007 | Polimeni, Jr. | |
| 7,207,291 B1 | 4/2007 | Watts | |
| 7,228,816 B2 | 6/2007 | Turner et al. | |
| D549,402 S * | 8/2007 | Mangan et al. | D30/125 |
| 7,320,296 B2 | 1/2008 | Morrison | |
| 7,895,975 B2 * | 3/2011 | Markham | 119/61.5 |
| 7,930,994 B2 * | 4/2011 | Stone et al. | 119/52.1 |
| 2002/0185073 A1 | 12/2002 | Fullerton et al. | |
| 2003/0056730 A1 * | 3/2003 | Corti et al. | 119/53 |
| 2003/0106497 A1 * | 6/2003 | Heinzeroth et al. | 119/61 |
| 2004/0177815 A1 * | 9/2004 | Sage, Jr. | 119/61.3 |
| 2005/0039689 A1 | 2/2005 | Mossmer | |
| 2005/0139162 A1 | 6/2005 | Polimeni | |
| 2005/0217591 A1 | 10/2005 | Turner et al. | |
| 2005/0268862 A1 | 12/2005 | Morrison | |
| 2006/0005774 A1 * | 1/2006 | Newman Bornhofen | 119/61.5 |
| 2006/0213447 A1 | 9/2006 | Kitchen et al. | 119/61.5 |
| 2006/0231037 A1 * | 10/2006 | Gross | 119/52.1 |
| 2006/0231039 A1 | 10/2006 | Abinanti et al. | |
| 2007/0245968 A1 | 10/2007 | Iljas | |
| 2008/0072829 A1 | 3/2008 | Kerrigan et al. | |
| 2008/0141945 A1 | 6/2008 | Markham | |
| 2009/0064938 A1 | 3/2009 | Or | |
| 2009/0255475 A1 * | 10/2009 | Black | 119/53 |

* cited by examiner

PET FEEDING DISH AND SYSTEM

CROSS REFERENCE

This application claims priority under 35 U.S.C. §119(e) to U.S. Provisional Patent Application No. 61/100,505, filed Sep. 26, 2008, the entirety of which is hereby expressly incorporated by reference herein.

FIELD

The present invention relates to a food dish and more particularly to an animal food dish that is capable of regulating or metering food delivered for actual animal consumption.

BACKGROUND

Pets, particularly cats, have a tendency of overeating when presented with a dish full of food. Obesity related problems, including thyroid related problems, can occur, which obviously are extremely undesirable. In addition, many animals, including cats in particular, are instinctively programmed to hunt or otherwise work to obtain their food.

What is needed is a food dish that discourages pet overeating. What is also needed is a food dish that takes advantage of an animal's instinctive predatory tendencies to seek and obtain food.

SUMMARY

The present invention is directed to a pet feeding dish and feeding system that is configured to help regulate food intake of a pet, such as a cat or dog. Where the pet is of a type possessing hunting instincts, the dish can be configured to present food in a manner that challenges the pet and correspondingly reduces the pet's food consumption rate by making the pet work for its food.

Such a dish is configured so the pet is unable to eat directly from it but rather in a manner where the pet must manually move food it wishes to eat, typically with a paw or the like, to a location where it can be eaten. Such a dish can be configured or is configurable in a manner that prevents the pet to access all of the food held by the dish thereby also helping regulate food intake.

In one embodiment, a pet feeding system is provided that includes a feeding dish with a bottom, e.g., floor, and a housing that extends upwardly from the floor, defining a food-receiving chamber between the floor and the housing. Such a feeding dish can be constructed as a dish assembly where the floor removably attaches to a portion of the housing. The housing includes a food discharge outlet that can be a chute with an opening that faces and is vertically spaced from the floor. Food is dispensed in a manner so that the pet does not have access to the entire contents of the food at a given time. While in use, the total volume of food held can be located in different parts of the dish. For example, there can be (i) a dispensed volume of food that sits upon the floor, (ii) a supporting volume of food that extends upwardly between the dispensed volume of food and the chute opening, and (iii) a stored volume of food that is supported from below by the supporting volume of food and is held within the chute.

In another embodiment, the dish housing includes multiple feeding ports that extend into the chamber and are spaced from each other about a perimeter of the housing. The housing can also have multiple windows that extend into the chamber that allow a pet to look therethrough and see dispensed food within the chamber, including food sitting on the floor. Where equipped with such viewing windows, the windows are also spaced from each other about the perimeter of the housing and can be positioned alternatingly between the feeding ports.

In yet another embodiment, the dish assembly opening of a bowl is spaced from the floor by a first distance that is less than a second distance that is defined by a width across the opening of the bowl. In other words, the opening of the bowl can be placed a distance to the floor that is smaller that a distance across the opening, itself.

In another embodiment, the housing has a hemispherical shape and the bowl is in communication with an upper portion of the housing. The housing and bowl can be integrally connected so that an upper edge of the housing curves downwardly toward the chamber and transitions into a sidewall of the bowl. The sidewall of the bowl can be connected to a chute such that the opening of the bowl assembly is defined at the bottom of the chute. The chute is funnel-like or conical so as to direct food that falls through the opening to a relatively small location on the underlying floor where it can accumulate in the chamber.

In yet other embodiments, the bowl is part of an assembly that includes a container that extends upwardly from at least one of the bowl and the chute. The container can be supported by an annular land that extends inwardly from the bowl and/or chute. The container can be removable from the bowl and can be configured to receive a cap that prevents a pet from accessing food in the container. In another embodiment, there is a cap that overlies the bowl that prevents direct pet access to food in the bowl. Such a cap can be configured to be adaptable to fit on such a container or seat in the annular land.

In another embodiment, during use, the system dispenses food in a manner that can be discontinuous and at a rate that corresponds to a rate at which a pet removes food from a dish or dish assembly of the system. A bowl is filled with a volume of food, some of which passes through an opening and accumulates on a floor and within a chamber defined below the bowl. Access to the dispensed food is only permitted through a housing of the dish assembly; for example, by way of a feeding port that extends into the chamber. When a pet removes some of the dispensed food from the chamber, some supporting food is dispensed, such as by gravity, from above to replace food on the floor removed by the pet. Furthermore, some stored food falls, such as by gravity, through the opening and onto the (replaced) dispensed food, piling and accumulating thereupon until it reaches the opening and itself, whereby it supports the stored food waiting in line at or adjacent the opening so that the stored food is held in the bowl, until more of dispensed food received in the chamber is removed and such dispensing and replenishing cycle repeats.

BRIEF DESCRIPTION OF THE DRAWINGS

One or more preferred exemplary embodiments of the invention are illustrated in the accompanying drawings in which like reference numerals represent like parts throughout and in which.

Figure 1:
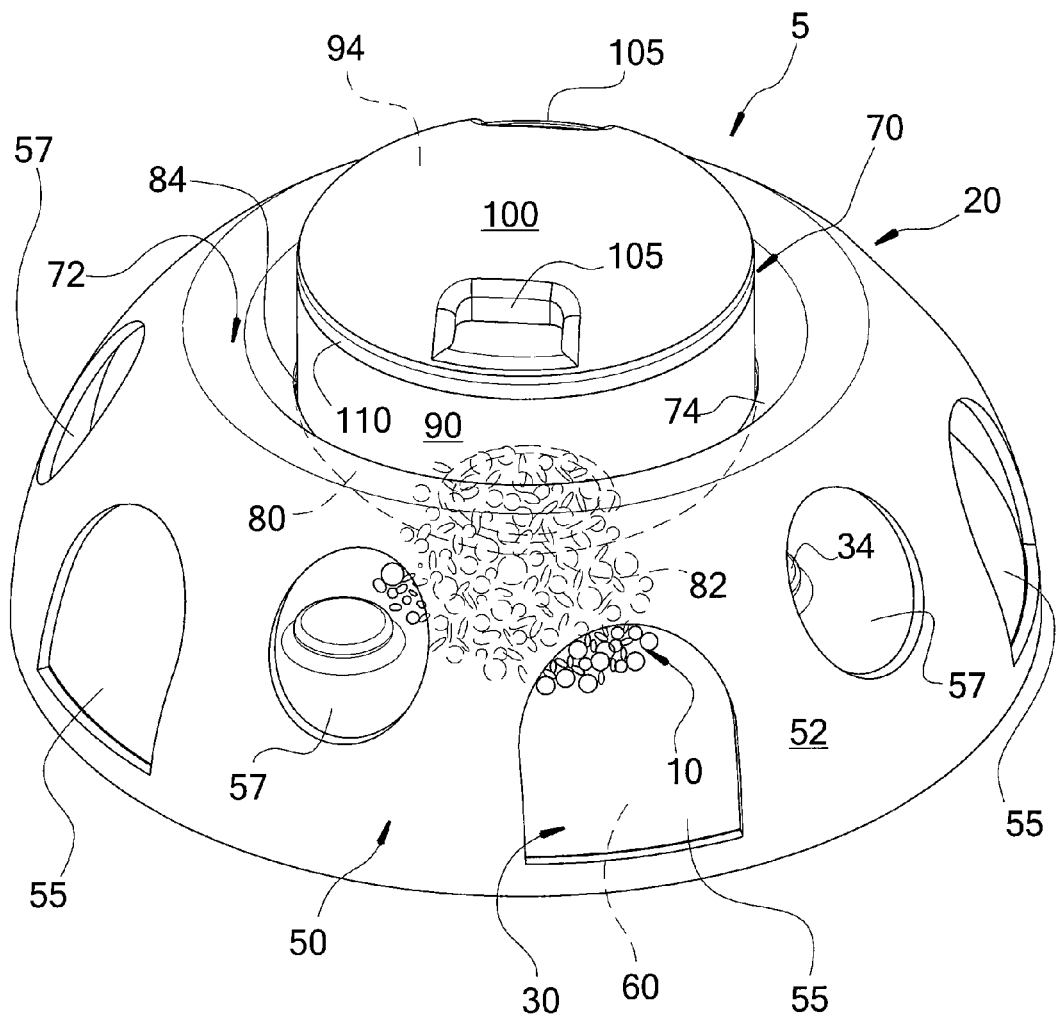
FIG. 1 is an upper pictorial view of a first embodiment of a dish assembly of a pet feeding system of the invention.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

Figure 2:
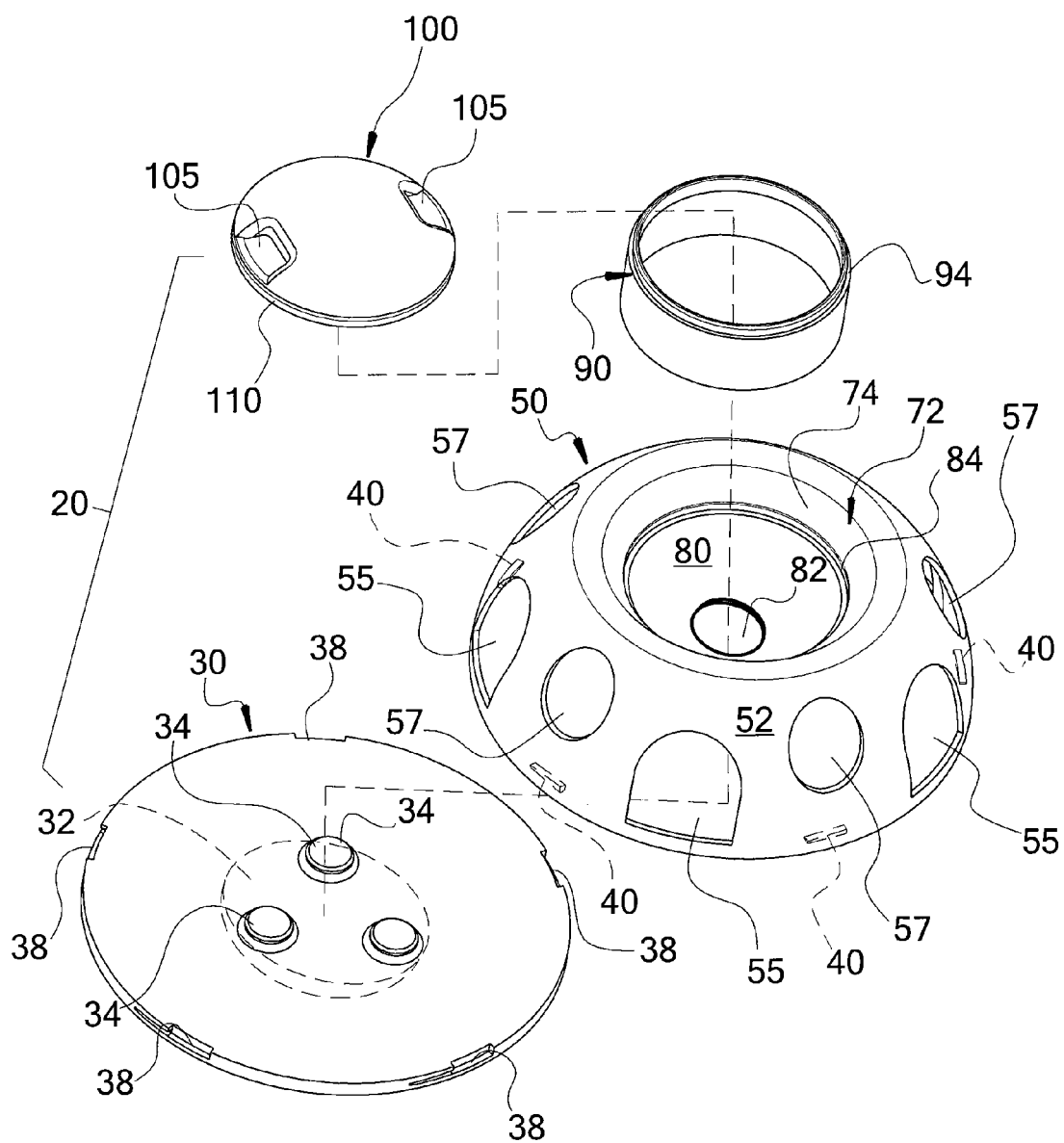
FIG. 2 is an exploded pictorial view of the dish assembly of FIG. 1.
Figure 3:
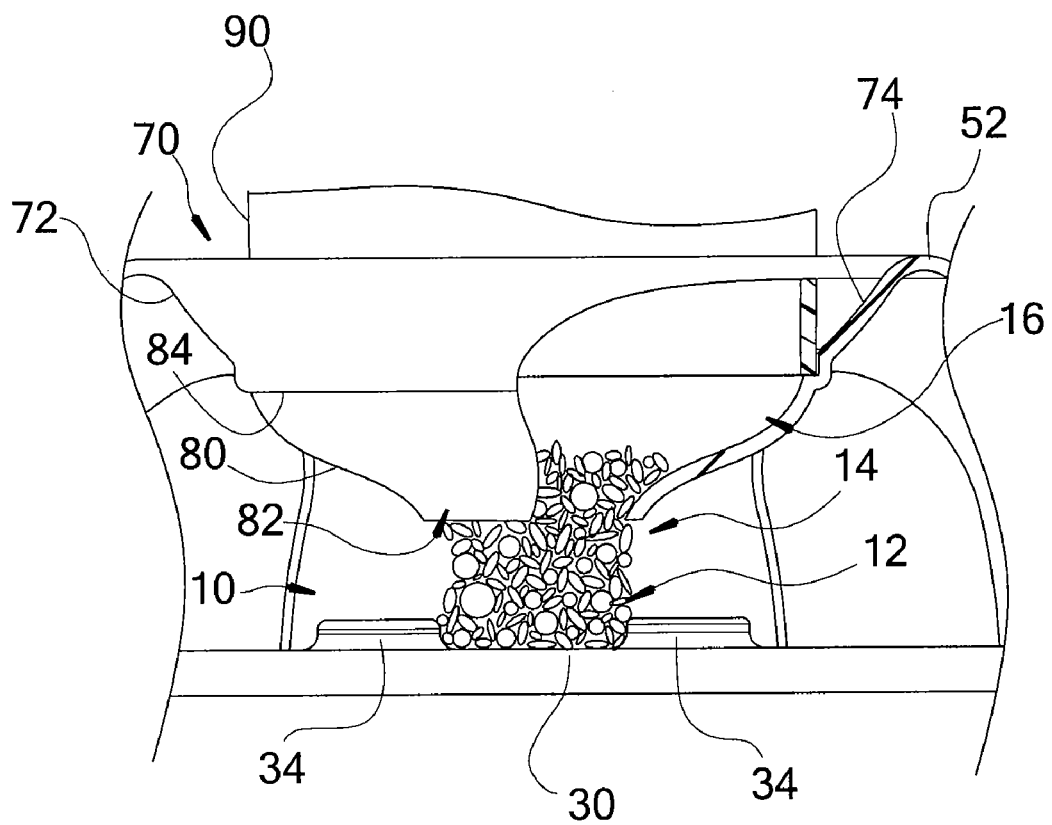
FIG. 3 is a cross-sectional side elevation view of various components of the dish assembly of FIG. 1.

FIGS. 1-3 illustrate an exemplary but preferred embodiment of a pet feeding system 5 that is designed for providing pet food 10 to a pet, such as a cat or dog (not illustrated), in a manner that regulates and thereby is capable of reducing the pet's food consumption rate. The pet feeding system 5 includes a feeding dish or dish assembly 20 that holds and meters food delivery. The dish assembly 20 shown in FIGS. 1-3 includes (i) a floor 30, (ii) a housing 50 that extends upwardly from the floor 30, (iii) a food-receiving chamber 60 which is a void space defined between the floor 30 and housing 50, and can include (iv) a bowl assembly 70 that can serve as a food-dispensing receptacle.

Still referring to FIGS. 1-2, floor 30 is removably attached to a bottom portion of the housing 50 thereby enabling it to be easily removed for cleaning, such as in a dishwasher. If desired, floor 30 can instead be integrally formed as part of the housing. Floor 30 supports food 10 that has been delivered within the housing 50 in the food-receiving chamber 60, and can also support the housing 50 itself.

If desired, floor 30 can be configured in a manner that helps contain food 10 received in the chamber 60 in a desired area and/or that provides obstacles to make it more challenging for a pet to reach and obtain food 10 in the chamber 60. For example, as is shown in FIGS. 1 and 2, floor 30 includes a food supporting platform 32 from which a plurality of upraised portions 34 extend upwardly therefrom. In a preferred embodiment, there is a plurality of pairs, i.e., at least three, upraised portions 34 spaced about an area of the platform 32 where food 10 dispensed through outlet 82 is received, e.g., lands, opposing food dispensed into the chamber 60 from flowing toward any one of the feeder ports 55 helping meter food intake by the pet. In a currently preferred embodiment, there are at least three upraised portions 34 which are generally circular in shape that are spaced about and outwardly of a center of the platform 32 where food 10 drops through the opening 82 in the housing 50 downwardly onto the platform 32.

If desired, platform 32 can also be upraised. Additionally, the platform 32 and upraised portions 34 can be integrally formed of or as part of the floor 30 in a manner that produces a floor 30, platform 32 and upraised portions 34 as a single component that is of one-piece, unitary and substantially homogenous construction. If desired they can be constructed separately, such as in disc or pad form, and attached to the floor 30.

Referring specifically now to FIG. 2, for embodiments in which the floor 30 is removably attached to the housing 50, the floor 30 and housing 50 have cooperating interlocking structures that are configured to engage each other as a snap fit, twist locking, or other suitable engagement mechanism(s). Twist locking versions include cooperating grooves or ramps 38 and tabs 40 that engage each other to couple the floor 30 with the housing 50. Ramps 38 are provided on an outer circumferential surface at the perimeter edge of the floor 30. The tabs 40 extend inwardly from the housing 50 and are spaced from each other by the same distances as those between the ramps 38, whereby the floor 30 and housing 50 mechanically engage each other at multiple locations about the perimeter of the dish assembly 20. This is done by aligning the corresponding ramps 38 and tabs 40 with each other and then rotating the housing 50 upon the floor 30 so that it circumferentially advances until the ramps 38 and tabs 40 are fully engaged with each other.

Referring again to FIGS. 1-2, housing 50 includes a sidewall 52 that extends around a periphery of the chamber 60, and multiple openings such as feeder ports 55 and windows 57 that extend through the sidewall 52 and permit access to the chamber 60. A bottom portion of the sidewall 52 fits over and just outside of the outer perimeter of floor 30, whereby the floor 30 is housed concentrically within such overlapping bottom portion of the sidewall 52. It is at this overlapping portion of the floor 30 and sidewall 52 where (i) the tabs 40 that extend from an inwardly facing surface of the sidewall 52, and (ii) the ramps 38 of the outwardly facing surface of floor 30, engage with each other. For embodiments in which the floor 30 has a round perimeter shape, the sidewall 52 extends upwardly from the floor 30 in a generally annular fashion, and a diameter of the sidewall 52 decreases as a height of the sidewall 52 increases. This gives the sidewall 52 a generally hemispherical shape that covers the chamber 60.

At least one, and preferably multiple circumferentially spaced apart, feeder ports 55 extend through the sidewall 52. The feeder ports 55 are configured to allow a pet, for example, a cat, to access food 10 by extending its paw through the sidewall in a first direction and dragging some of the food 10 out of the dish assembly 20 in a second, opposite direction. Each feeder port 55 is a passageway defined between two parallel and upwardly extending side edges that are connected to each other by an arcuate top edge. An overall height of the feeder port 55 is about 1.5 inches or about 2 inches, and extends about ⅔ of the way up the height of or along the outer surface of the sidewall 52. An overall width of the feeder port 55 is about 1.25 inches or about 1.75 inches and the port width being about ¼ of the outer diameter of the sidewall 52. These exemplary dimensions are most suitable for implementations of dish assembly 20 that are configured for use with cats as the pets, in light of typical sizes of domesticated cats.

At least one, and preferably multiple circumferentially spaced apart, windows 57 extend through the sidewall 52 at locations that are higher up on the sidewall as compared to the feeder ports 55. The windows 57 are round, oval, or otherwise shaped apertures that are configured to allow a pet to see into the chamber 60, that is, through the sidewall 52 to see the food 10 sitting upon the floor 30. Each window 57 is somewhat shorter and narrower than the feeder port 55, dissuading pets from reaching through the windows 57 instead of the feeder ports 55.

Regardless of the particular shape and dimensions of the feeder ports 55 and windows 57, together, they give the sidewall 52 a generally perforated configuration in which the material of the sidewall 52 continuously meanders between the feeder ports 55 and windows 57. The feeder ports 55 and windows 57 can be sized so that the overall surface area of the sidewall 52 is at least about 25% void space, optionally, at least about 50% void space, at least about 75% void space, so long as there is enough material in sidewall 52 to suitably support the bowl assembly 70.

Referring now to FIGS. 1-3, bowl assembly 70 includes a bowl 72 that can also serve as a food-dispensing receptacle, a chute 80, a container 90, and a cap 100 that, together, define an enclosure which holds food 10 prior to its dispensation upon the floor 30. An upper edge of bowl 72 is connected to the upper edge of the sidewall 52 of housing 50. From the ring-like connection between the bowl 72 and housing 50, a sidewall 74 of the bowl 72 extends downwardly into the chamber 60, whereby the bowl 72 defines a concavity or depression that is recessed into the housing 50.

A chute 80, which is configured to direct and guide food 10 that drops from the bowl 72 into the chamber 60, extends downwardly from the bottom of bowl 72, further into the chamber 60. Chute 80 preferably has a funnel-like contour and its upper edge is connected to the lower edge of bowl 72 so that the bowl sidewall 74 and chute 80 define a unitary, continuous structure. At the bottom of chute 80, an opening 82 extends therethrough which faces downwardly toward the floor 30. Opening 82 is sized and configured based on the particular type of food 10 that is used in the dish assembly 20.

For example, when food 10 is a dry, kibble-type cat food made of multiple particles or granules of food 10, the opening 82 can have a diameter of about 1.5 inches or a bit less, for example, about 1⅜ inch, and is spaced about 1 inch, or a bit less, for example, about ⅞ inch, from the upper surface of floor 30, whereby the opening 82 in such embodiments is spaced from the floor 30 by a distance that is less than a width or diameter dimension of the opening 82. The opening diameter, spacing from the bottom wall, and tapering angle of the chute 80, are selected to provide a desired amount of food 10 on the floor 30 while maintaining a remainder of the food in the bowl 72 and chute 80 in a manner that is described in greater detail elsewhere herein. Where the food 10 is dog food having larger particles or chunks, such dimensions can be increased in accordance with that discussed herein to produce a dish or dish assembly adapted for dog food use.

Referring now to FIGS. 2-3, at an upper end of the chute 80, an annular land 84 extends radially inwardly from the chute, optionally from the bowl sidewall 74, providing a ledge or shoulder-like structure. A diameter of the annular land 84 preferably corresponds to a diameter of the container 90 and cap 100, so that the annular land 84 can support the cap 100 directly or support the container 90 which in turn supports the cap.

Referring again to FIGS. 1-3, container 90 is a cylindrical tube that sits upon the annular land 84 and extends upwardly from the chute 80 and/or bowl 72, over the opening 82 of the chute 80. The volume of container 90 is selected so that the dish assembly 20 can hold a desired amount of food, whereby shorter containers 90 are used when less food is to be held in the dish assembly 20 and longer (taller) containers 90 are used when more food is to be held in the dish assembly 20. An upper edge of the container 90 includes an annular land 94 that is largely analogous to the annular land 84 of the chute 80, whereby it is configured as a supporting shoulder for holding the cap 100 on the top of the container 90.

Referring now again to FIGS. 1-2, cap 100, as discussed before, can be placed directly on the annular land 84 of the chute 80 if the container 90 is not being used, or can be placed on the annular land 94 of the container 90 if the container is being used. Cap 100 has multiple handgrips 105 formed in its outer surface and a downturned lip 110 about its outer periphery that seats upon the annular land 84, 94 of the chute 80 or container 90. The cap 100 prevents a cat from eating directly from the bowl 72 thereby enabling the top height of the bowl 72 to be made low enough where a cat can access it (thus necessitating use of cap 100).

Preferably, the various components of the dish assembly 20 are made from any of a variety of suitable polymeric materials that are well known within the art. Furthermore, such polymeric components such as, for example, various ones of the floor 30, housing 50, and bowl assembly 70, can be impregnated, coated with, and/or otherwise treated with various antibacterial and/or moisture absorbent materials. In some embodiments, various components of the dish assembly 20 can also be scented, such as to attract a cat or other pet to the chamber 60. In yet other embodiments, one ore more components of the dish assembly 20 is made from non-polymeric materials, for example, being made from ones of ceramic, glass, metallic, and/or other materials depending on the intended end use configuration of the dish assembly 20.

In at least one preferred embodiment, at least the dish housing 50 is made of plastic, such as a polyethylene or polyurethane, which is clear enough where a pet can view food 10 disposed in the chamber between the housing 50 and floor 30. This not only helps a pet to locate the food 10, but also adds to the challenge presented to the pet by enticing the pet yet making it difficult to reach. In one preferred embodiment, the dish housing 50, including the bowl 72, chute 80, opening 82, ports 55 and windows 57 are formed as a single component that is of one-piece, unitary and substantially homogenous construction.

In light of the above, during use of the pet feeding system 5, food 10 is presented to a pet in a manner that challenges the pet, and reduces the pet's food consumption rate such that it can and preferably does help regulate pet food intake. That is done by way of dish assembly 20 that simulates certain hunting-like scenarios in a manner that takes advantage and encourages the natural instinct of a cat to want to seek out, hunt as well as "play" with its food 10. As a result of the cat having to work to get its food in this manner, it reduces the likelihood of cat overeating preferably preventing it.

Referring again to FIGS. 2-3, to use the pet feeding system 5, a user connects the floor 30 to the housing 50 and places food 10 in either, directly in the bowl 72 or into the container 90 and thus also into the bowl 72. Upon so doing, some food 10 is gravity dispensed through the opening 82 of chute 80 and it begins piling on the floor 30. It is noted that only some of the food 10 that enters the bowl 72 passes through the chute 80, opening 82, and piles onto the floor 30, with the remainder of the food 10 being held upstream of the floor 30 in such dispensation series. At this point, the entire contents of food 10 can be defined as three distinct portions or volumes.

Referring specifically now to FIG. 3 and to the multiple portions of the entire volume of food 10, dispensed food 12 sits directly upon the upper surface of floor 30. The dispensed food 12 occupies an area on the floor 30 that extends generally across the upraised platform 32 or between the upraised buttons 34. Typically, after first filling the dish assembly 20 with food, the dispensed food 12 spills across and sits upon a central portion of the floor so that it is spaced from the outer perimeter of the floor 30. The upraised buttons 34 can mechanically restrain the dispensed food 12 from expanding or spilling radially or outwardly beyond their position upon the floor. Accordingly, a perimeter shape and width of a footprint of the dispensed food 12 upon the floor 30 corresponds to the spacing between the adjacent upraised buttons 34, as well as the radial distance between the upraised buttons 34 and the opening 82 of chute 80 or the middle of the floor 30.

For example, when the upraised buttons 34 are spaced from the middle of the floor 30 by a distance of about 1¼ inch, as defined between a central axis of the floor 30 and the surface of upraised buttons 34 that is closest thereto, the dispensed food 12 typically will spill across and settle in a manner that forms a generally circular perimeter shape having a similar radius, that is about 1¼ inch to about 2 inches, depending on the particular characteristics of the individual kibbles of the food 10, that is, their size, density, greasiness or dryness, and/or other factors. Stated another way, in some embodiments, the positions of the upraised buttons 34 upon the floor 30 influences a perimeter size and shape of the dispensed food 12.

Furthermore, the positions of upraised buttons 34 upon the floor 30 are selected to provide a challenge to the pet when trying to withdraw food 10 from the chamber 60, but without being unduly difficult to surmount so as to not overly frustrate the pet. This can be accomplished by positioning the upraised buttons 34 on the floor 30 so that they are spaced about 1½ inch or more from an outer perimeter of the floor 30 and providing the upraised buttons 34 with diameters of about 1 inch. Furthermore, the upraised buttons 34 are preferably located off-center or at least somewhat misaligned with the feeder ports 55 which allows the pet to withdraw food from the chamber 60 by dragging pieces of the dispensed food 12 straight from the feeder ports 55 or generally radially across the floor 30.

When some of the dispensed food 12 is dragged from the chamber 60, a similar amount of supporting food 14 falls onto the floor 30, taking the place of the removed dispensed food 12. Doing so generally maintains the volume and perimeter shape of the dispensed food 12, by way of gravity replacing the dispensed food 12 with some of the supporting food 14. Stated another way, supporting food 14 extends upwardly from the dispensed food 12, typically, in a pile that decreases in width as it increases in height so that it resembles a cone or pyramid.

The uppermost pieces of the supporting food 14 are positioned within the opening 82 of the chute 80, such that the supporting food 14 serves as a plug that maintains position of the stored food 16 that is held in the chute 80 and bowl 72, preventing the stored food 16 from falling through the opening 82. In this regard, the pet controls the rate of dispensation of the food 10 because food passes through the chute 80 and out of the opening 82 at approximately the same rate as the pieces of the dispensed food 12 is removed from the remainder of the dispensed food 12 pile and, for example, removed from the chamber 60.

It is noted that for such intermittent dispensation of food 10 to work suitably well, in preferred embodiments, the plugging action of supporting food 14 is directly primarily upwardly into the opening 82. In other words, since there is a negligible amount of horizontally directed jamming that occurs within the chute 80, if there is no supporting food 14 that directly holds the stored food 16 from below, then at least some of the stored food 16 will freely slide through the chute 80 and fall out of the opening 82. This continues to occur, whereby a pile is formed below the opening 82 and upon the dispensed food 12, until such pile reaches such a height that the upper part of the pile abuts the stored food 16, whereby the pile (FIG. 3) once again defines a supporting food 14 volume. Accordingly, the particular diameter of opening 82 of the chute 80 and the distance from opening 82 from the underlying floor 30 are selected based on, for example, typical kibble size and shape of food 10 so as to impart such a vertically directed jamming or plugging characteristic of the supporting food 14 at opening 82, for supporting the stored food 16.

Various alternatives are contemplated as being within the scope of the subject matter regarded as the invention. For example, in some embodiments, floor 30 is not a component of the dish assembly 20, but instead is defined as a portion of a floor of a building in which the feeding system 5 is used and which underlies the housing 50. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A pet food dish comprising:
a bottom upon which pet food is disposed;
a generally upwardly extending sidewall extending around the bottom having a plurality of spaced apart food access ports formed in the sidewall that are each configured to prevent pet food disposed on the bottom from being eaten by a pet while permitting insertion of a paw of the pet through one of the plurality of food access ports enabling engagement of pet food disposed on the bottom and withdrawal of pet food disposed on the bottom through the one of the plurality of food access ports; and
a top overlying the bottom and defining a food-receiving chamber with the bottom and the sidewall, the top having an opening through which pet food falls downwardly into the food-receiving chamber and onto the bottom, and the top comprising an integrally formed food-receiving recess with the opening comprising an outlet formed in the food-receiving recess that is in fluid-flow communication with the food-receiving chamber through which food from the food-receiving recess flows onto the bottom in the food-receiving chamber.

2. The pet food dish of claim 1 wherein the bottom is generally circular, wherein the sidewall is made of a relatively clear material through which the pet can view food disposed on the bottom, and wherein the sidewall is generally annular having food access ports spaced apart about the entire periphery of the bottom.

3. The pet food dish of claim 2 wherein the bottom is removably attached to the sidewall.

4. The pet food dish of claim 1 wherein the food-receiving recess comprises a concave generally funnel-shaped chute formed in the top.

5. The pet food dish of claim 1 wherein the top and bottom are generally circular, wherein the sidewall is made of a relatively clear material through which the pet can view food disposed on the bottom, and wherein the sidewall is generally annular having food access ports spaced apart about the bottom along the entire periphery of the sidewall.

6. The pet food dish of claim 5 wherein the bottom is removably attached to the sidewall.

7. The pet food dish of claim 1 wherein the sidewall has a food viewing window formed therein that is disposed between a plurality of the food access ports with the food viewing window extending above the food access ports enabling a pet to see through the sidewall into the food-receiving chamber.

8. The pet food dish of claim 1 wherein the top and sidewall comprise a housing enclosing the bottom.

9. The pet food dish of claim 8 wherein the top and sidewall form a housing of one-piece construction.

10. The pet food dish of claim 9 wherein the food-receiving recess comprises a bowl integrally formed of the top of the housing.

11. The pet food dish of claim 9 wherein the food-receiving recess comprises a food-dispensing receptacle.

12. The pet food dish of claim 1 further comprising a removable cover that overlies the food-receiving recess covering the food-receiving recess.

13. The pet food dish of claim 1 further comprising a removable food-holding container that engages the housing in operable cooperation with the food-receiving recess holding food in the food-holding container.

14. The pet food dish of claim 1 further comprising a removable cover that covers the food-holding container.

15. The pet food dish of claim 1 wherein the food comprises particulate or granular pet food and the outlet is spaced above the bottom a distance that allows food passing through the outlet to form a pile that extends from the bottom to the outlet when some food remains in the food-receiving recess.

16. The pet food dish of claim 1 wherein each food access port has a bottom edge extending adjacent to and alongside part of the bottom.

17. The pet food dish of claim 16 wherein the bottom edge of each food access port is generally straight.

18. The pet food dish of claim 17 wherein each food access port has a generally upside down U-shape.

19. The pet food dish of claim 17 wherein the sidewall further comprises a food viewing window formed therein that is disposed between a pair of adjacent food access ports having a bottom at a height higher than the bottom edge of each one of the pair of adjacent food access ports and having a top at a height higher than a top of each one of the pair of adjacent food access ports.

20. The pet food dish of claim 1 wherein the top and sidewall form a generally hemispherical housing and wherein the food-receiving recess comprises a generally conical chute formed in the top of the generally hemispherical housing.

21. The pet food dish of claim 1 wherein the bottom has an upraised portion disposed outwardly of the outlet that opposes food that has passed through the outlet into the food receiving chamber from flowing toward the plurality of food access ports.

22. The pet food dish of claim 21 wherein the upraised portion comprises a plurality of upraised portions spaced about an area of the bottom onto which food passing through the outlet drops.

23. The pet food dish of claim 22 wherein each upraised portion comprises a generally round button integrally formed of the bottom that is upraised therefrom.

24. A pet food dish comprising:
a housing comprising (a) a sidewall having at least one pet food access port through which a pet can reach part of its body through to engage food within the housing and (b) a food-receiving recess formed of the housing overlying a bottom defining a food-receiving chamber therebetween with the food-receiving recess having a food-dispensing outlet in fluid-flow communication with the food-receiving chamber; and
a food-holding container that seats on the housing and is disposed in fluid-flow communication with the outlet.

25. The pet food dish of claim 24 wherein the food-holding container, the food-receiving recess in which the food-holding container seats, and the outlet define a food-dispensing receptacle through which food passes into the food-receiving chamber.

26. The pet food dish of claim 25 wherein the food comprises particulate or granular pet food and the outlet is spaced above the bottom a distance that allows food passing through the outlet to form a pile that extends from the bottom to the outlet when at least some food remains in the food-dispensing receptacle.

27. The pet food dish of claim 24 wherein the bottom is generally circular, wherein the sidewall is made of a relatively clear material through which the pet can view food disposed on the bottom, wherein the sidewall extends upwardly from the bottom having food access ports spaced apart about the entire periphery of the bottom.

28. The pet food dish of claim 24 wherein the food-receiving recess comprises a bowl formed of the housing and wherein the food-holding container comprises a tubular food-holding container having a removable cover with the food-holding container removably seating in the bowl.

29. A pet food dish comprising a housing having (a) a generally annular and relatively clear sidewall encircling a bottom defining a food-receiving chamber therebetween with the sidewall having a plurality of food access ports spaced about a periphery of the bottom configured to prevent pet food disposed on the bottom from being eaten by a pet while permitting insertion of a paw of the pet through one of the plurality of food access ports enabling engagement of pet food disposed on the bottom and withdrawal of pet food disposed on the bottom through the one of the plurality of food access ports, and (b) a top with an opening through which pet food is deposited onto the bottom, the top comprising a food-receiving recess formed therein with the opening comprising an outlet in fluid-flow communication with the food-receiving chamber inside the housing through which pet food in the food-receiving recess passes into the food-receiving chamber.

30. The pet food dish of claim 29 further comprising a tubular food-holding container that operatively cooperates with top of the housing defining a food-dispensing receptacle from which particulate or granular pet food is dispensed by gravity into the food-receiving chamber.

31. The pet food dish of claim 29 further comprising a cover removably received on the housing.

32. The pet food dish of claim 29 wherein the food-receiving recess comprises a generally conical chute formed in the top of the housing.

33. The pet food dish of claim 29 wherein the food-receiving recess comprises a bowl.

34. The pet food dish of claim 29 wherein the sidewall further comprises a plurality of spaced apart food viewing windows formed therein that are each disposed between a pair of adjacent food access ports with each food viewing window extending upwardly to a height higher than the pair of adjacent food access ports.

35. The pet food dish of claim 29 wherein each food access port has a bottom edge extending adjacent to and alongside part of the bottom.

36. The pet food dish of claim 35 wherein the bottom edge of each food access port is generally straight.

37. The pet food dish of claim 36 wherein each food access port has a generally upside down U-shape.

38. The pet food dish of claim 36 wherein the sidewall further comprises a food viewing window formed therein that is disposed between a pair of adjacent food access ports having a bottom at a height higher than the bottom edge of each one of the pair of adjacent food access ports and having a top at a height higher than a top of each one of the pair of adjacent food access ports.

39. The pet food dish of claim 29 wherein the housing is generally hemispherical.

40. The pet food dish of claim 29 wherein the bottom has an upraised portion located outwardly of the outlet that opposes food that has passed through the outlet into the food receiving chamber and onto the bottom from flowing outwardly toward the plurality of food access ports.

41. The pet food dish of claim 40 wherein the upraised portion comprises a plurality of upraised portions spaced outwardly of an area of the bottom onto which food passing through the outlet drops.

42. The pet food dish of claim 41 wherein each upraised portion comprises a generally round button integrally formed of the bottom that is upraised therefrom.

* * * * *